(12) United States Patent
Minzoni et al.

(10) Patent No.: US 9,524,209 B2
(45) Date of Patent: *Dec. 20, 2016

(54) METHODS OF COMPUTER MEMORY ACCESS AND COMPUTER MEMORY ERROR CORRECTION

(71) Applicant: XI'AN UNIIC SEMICONDUCTORS CO., LTD., Xi'an (CN)

(72) Inventors: Alessandro Minzoni, Xi'an (CN); Ni Fu, Xi'an (CN)

(73) Assignee: XI'AN UNIIC SEMICONDUCTORS CO., LTD., Xi'an (CN)

( * ) Notice: Subject to any disclaimer, the term of this patent is extended or adjusted under 35 U.S.C. 154(b) by 109 days.

This patent is subject to a terminal disclaimer.

(21) Appl. No.: 14/528,944

(22) Filed: Oct. 30, 2014

(65) Prior Publication Data

US 2015/0121172 A1    Apr. 30, 2015

(30) Foreign Application Priority Data

Oct. 31, 2013  (CN) .......................... 2013 1 0537686

(51) Int. Cl.
*G06F 11/00*    (2006.01)
*G06F 11/10*    (2006.01)

(52) U.S. Cl.
CPC ....... *G06F 11/1048* (2013.01); *G06F 11/1008* (2013.01); *G06F 11/1076* (2013.01)

(58) Field of Classification Search
CPC ............. G06F 11/1048; G06F 11/1008; G06F 11/1064; G06F 11/1044
See application file for complete search history.

(56) References Cited

U.S. PATENT DOCUMENTS

| | | | | |
|---|---|---|---|---|
| 6,718,443 B2* | 4/2004 | Yoshida | ............... | H04N 9/8042 375/E7.095 |
| 6,725,343 B2* | 4/2004 | Barroso | ............... | G06F 11/1064 711/141 |
| 6,987,717 B2* | 1/2006 | Hagiwara | ............ | G11B 7/0045 369/116 |
| 7,295,768 B2* | 11/2007 | Saito | .................... | H04N 5/9264 386/201 |
| 7,458,004 B2* | 11/2008 | Takahashi | ........... | G06F 11/1008 714/763 |
| 7,610,542 B2* | 10/2009 | Nagai | ................. | G06F 11/1008 714/763 |
| 8,255,783 B2* | 8/2012 | Kim | .................... | G06F 11/1044 714/805 |
| 9,170,897 B2* | 10/2015 | Losh | ................... | G06F 11/2053 |

* cited by examiner

*Primary Examiner* — Esaw Abraham
(74) *Attorney, Agent, or Firm* — Fish & Richardson P.C.

(57) ABSTRACT

A computer memory access method includes: receiving external data with a prefetching length; determining that the external data includes a masked data portion; at the time of a write enable signal being triggered, writing an unmasked data portion of the external data into a data storage unit of a computer memory by a writing unit; triggering a read enable signal at the time of the write enable signal being triggered and reading the unmasked data portion from the data storage unit by a reading unit while reading a third data portion corresponding to the masked data portion from the data storage unit; merging the unmasked data portion and the third data portion to a merged data and generating parity bits from the merged data by an error correction code encoding circuit; and writing the parity bits into a parity bit storage unit of the computer memory.

17 Claims, 5 Drawing Sheets

METHODS OF COMPUTER MEMORY ACCESS AND COMPUTER MEMORY ERROR CORRECTION

CROSS-REFERENCE TO RELATED APPLICATION

This application claims priority under 35 U.S.C. §119 to Chinese Patent Application No. CN 201310537686.3, filed on Oct. 31, 2013. The contents of this priority application are hereby incorporated by reference in their entirety.

TECHNICAL FIELD

The invention relates to computer memory access.

BACKGROUND

Error Correction Code (ECC) can be used to detect and correct erroneous data. It has been shown that numerous algorithms can support ECC, such as the common Hamming code, in which 8-bit data needs 4 parity bits and 64-bit data needs 7 parity bits. A proper algorithm may be selected according to the data length and the number of the data bits which need detection and correction. ECC is often used in the memory to detect and correct the erroneous data.

For example, as to different Double Date Rate (DDR) structures (DDR1/2/3), the data prefetching lengths for the typical stream in-and-out data reading are 32-bit, 64-bit and 128-bit. A reasonable and compromising solution is to use 7 parity bits or 8 parity bits for a 64-bit data (according to different ECC algorithms), as shown in FIGS. 1 and 2.

Nevertheless, as the presence of the Data Mask (DM), it is not easy for the Dynamic Random Access Memory (DRAM) to realize detection and correction functions. That is, when external data are written to the storage unit of DRAM, since one or more Bytes may be masked off, the data previously stored in the storage unit will not be overwritten. In this way, the ECC encoding process will not generate parity bits successfully, as shown in FIG. 3. In order to solve this problem, the simplest method is to split 64-bit data into 8 groups and each group consists of 8-bit data (one Byte), precisely corresponding to the mask length of DM, so as not to be effective by DM. Nevertheless, since each 8-bit data needs 4 parity bits, making the area of the whole storage array increase by 50%, the cost of DRAM is significantly increased. Therefore, it desperately needs a solution to address the problems and defects brought out by DM.

SUMMARY

One aspect of the invention features a computer memory error correction method by means of quick reading instead of writing. The computer memory error correction method comprises the following steps:

1) in response to a write enable signal being triggered, triggering a read enable signal without determining whether there is a data mask; and then determining whether there is a data mask;

2) in response to determining that there is a data mask: writing an unmasked portion of external data into a storage array of a computer memory, and then reading from the storage array by a reading circuit and transmitting to an error correction code encoding circuit the unmasked portion of the external data; reading from the storage array by the reading circuit and transmitting to the error correction code encoding circuit data corresponding to a masked portion of the external data which is not written into the storage array; and transmitting the unmasked portion of external data and the data corresponding to the masked portion of the external data synchronously read from the storage array; and 3) in response to determining that there is no data mask: writing the external data into the storage array, and then reading from the storage array by the reading circuit and transmitting to the error correction code encoding circuit the external data read from the storage array.

In the above step 1, the read enable signal becomes effective at the time when the clock and the write enable signal are both effective, and the read enable signal is triggered by the write enable signal.

Another aspect of the invention features a computer memory error correction method in which no determination whether there is data mask is carried out. The method comprises the following steps:

1) in response to a write enable signal being triggered, triggering a read enable signal without determining whether or not there is a data mask, 2) in response that there is a data mask, writing an unmasked portion of external data into a storage array, and then reading from the storage array by a reading circuit and transmitting to an error correction code encoding circuit the unmasked portion of external data; reading from the storage array by the reading circuit and transmitting to the error correction code encoding circuit the data corresponding to a masked portion of the external data which is not written into the storage array; transmitting the unmasked portion of the external data and the data corresponding to the masked portion of the external data synchronously read from the storage array.

A third aspect of the invention features a computer memory access method. The method comprises the following steps:

1) receiving external data with a certain prefetching length;

2) determining whether the external data comprises a masked data portion;

3) in response to determining that the external data comprises a masked data portion: in further response to a write enable signal being triggered, writing an unmasked data portion of the received external data into a data storage unit of a computer memory by a writing unit; triggering a read enable signal at the time of the write enable signal being triggered and reading the unmasked data portion from the data storage unit by a reading unit while reading a third data portion corresponding to the masked data portion from the data storage unit of the computer memory by the reading unit; merging the unmasked data portion and the third data portion to generate a merged data; generating parity bits from the merged data by an error correction code encoding circuit; and writing the generated parity bits into a parity bit storage unit of the computer memory; and 4) in response to determining that the external data comprises no masked data portion: in further response to a write enable signal being triggered, writing the external data into the data storage unit of the computer memory by the writing unit; triggering a read enable signal at the time of the write enable signal being triggered and reading the external data from the data storage unit by the reading unit; generating parity bits from the external data read from the data storage unit by the error correction code encoding circuit; and writing the generated parity bits into the parity bit storage unit of the computer memory.

In some implementations, the read enable signal is triggered by the write enable signal. In some examples, the unmasked data portion and the masked data portion are denoted by data mask signals. In a particular example, the unmasked data portion is denoted by a data mask signal with a value of 0, and the masked data portion is denoted by a data mask signal with a value of 1. Hamming code can be used to generate parity bits.

A fourth aspect of the invention features a computer memory access method for data mask, comprising the following steps:

1) receiving external data with a certain prefetching length, the external data comprising an unmasked first data portion and a masked second data portion, 2) in response to a write enable signal being triggered, writing the unmasked first data portion into a data storage unit of the memory by a writing unit; triggering a read enable signal at the time of the write enable signal being triggered and reading the first data portion from the data storage unit by a reading unit and meanwhile reading a third data portion corresponding to the masked second data portion from the data storage unit of the memory by the reading unit; merging the first data portion and the third data portion and sending the merged data to an error correction code encoding circuit to generate parity bits; and writing the generated parity bits into a parity bit storage unit of the memory.

In some implementations, the read enable signal is triggered by the write enable signal. In some examples, the unmasked first data portion and the masked second data portion are denoted by data mask signals. In a particular example, the unmasked first data portion is denoted by a data mask signal with a value of 0, and the masked second data portion is denoted by a data mask signal with a value of 1. Hamming code can be used to generate parity bits.

Note that the terms "unmasked" and "without being masked off" can be used interchangeably, and the terms "masked" and "being masked off" can be used interchangeably.

Another aspect of the invention features a computer-readable storage medium coupled to one or more processors and having instructions stored thereon which, when executed by the one or more processors, cause the one or more processors to perform operations in accordance with implementations of the methods provided herein.

Other aspects of the invention feature a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

Processors, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, a portable storage device (e.g., a universal serial bus (USB) flash drive), or other digital electronic devices, to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

Particular embodiments of the subject matter described in the invention can be implemented so as to realize one or more of the following advantages. A computer memory access method for memory can solve the problem in the existing method for the memory by means of reading instead of writing, i.e. the response time when data mask exists differs a lot from that when no data mask exists, which has adverse effect on the encoding of ECC and the writing process. The time tB for preparing data can be reduced, which improves the reading and writing time sequence and the working frequency. The time for ECC encoding can be extended. Additional circuits can be avoided and the probability of system failure can thus be reduced.

Other advantages and advantageous embodiments of the subject-matter of the invention will be appreciated from the description, the claims and the drawings. The features mentioned above and those set out below may also be used individually per se or together in any combination. The embodiment shown and described is not intended to be understood to be a conclusive listing but is instead of exemplary character for describing the invention. The Figures of the drawings show the subject-matter in a schematic manner and are not intended to be understood to be to scale.

DETAILED DESCRIPTION

Figure 1:
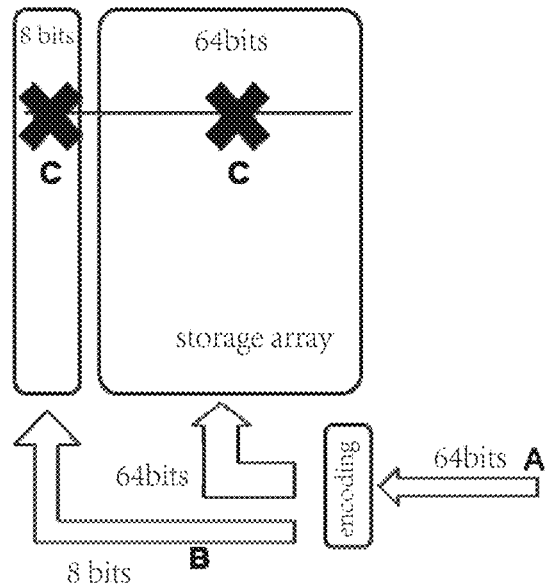
FIG. 1 is a flow chart of an existing writing process of ECC external data.

With reference to FIG. 1, the existing ECC encoding process can proceed in accordance with the following steps: First, the 64-bit external data are directly written (see A in FIG. 1). Second, 7 parity bits or 8 parity bits (see B in FIG. 1, as an example, the 8 parity bits are shown in FIG. 1) are generated from the 64-bit external data by an ECC encoding circuit according to a given rule. The given rule is a specific ECC algorithm. That is to say, ECC encoding circuit generates parity bits according to the ECC algorithm practically employed. The parity bits are used to detect and correct the data. Third, the new 64-bit data and the 7 parity bits or 8 parity bits are written to the storage array and completely substitute for the previously information stored in the storage array (see C in FIG. 1).

Figure 2:
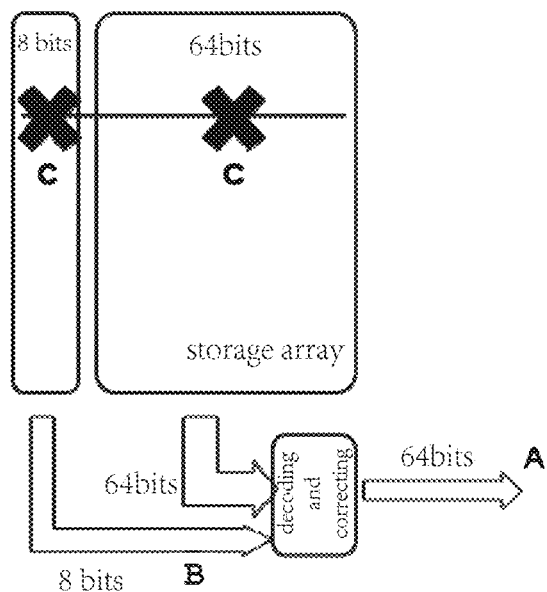
FIG. 2 is a flow chart of an existing reading process of ECC external data.

With reference to FIG. 2, the existing ECC decoding and correcting proceed in accordance with the following steps: First, the 64-bit data and 7 parity bits or 8 (see C in FIG. 2, as an example, the 8 parity bits are shown in FIG. 2) parity bits are read from the storage array. Second, the parity bits will decode and judge whether there are errors in the data according to a give rule. If there is an error, the parity bits will judge which bit is error and correct the erroneous data (see B in FIG. 2). The rule used herein corresponds to the rule used during the encoding process in FIG. 1. Third, the decoded data is read (see A in FIG. 2).

Figure 3:
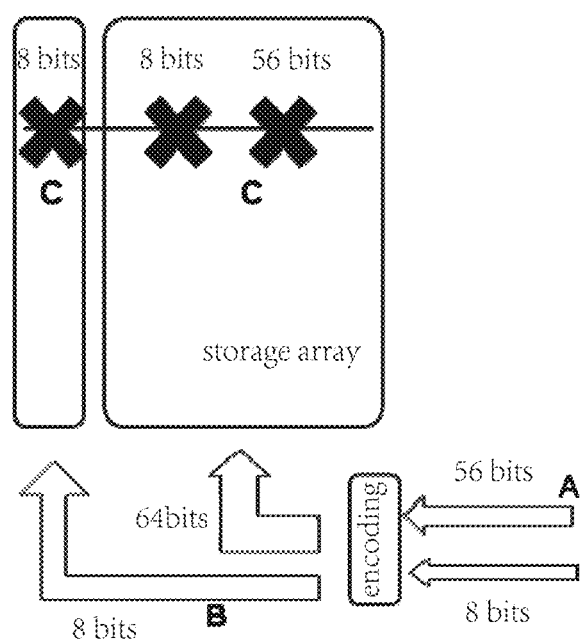
FIG. 3 is a flow chart of an existing writing process of ECC external data when there is a data mask.

With reference to FIG. 3, when there is data mask, the existing ECC encoding will proceed in accordance with the following steps. Nevertheless, it should be understood that now ECC encoding cannot work properly when there is data mask. First, the 56-bit data of the external 64-bit data are written to the storage array (see A in FIG. 3), and the remaining 8-bit data is masked off and is not written to the storage array. Second, the parity bits are still generated from the external 64-bit data (see B in FIG. 3). Third, in the storage array, the 56-bit data of the 64-bit data are substituted by the external data written into the storage array, and the remaining 8-bit data still keep their original information. As at this time, the parity bits are generated from the external 64-bit data, and they are totally error parity bits for the 64-bit data (56-bit external data plus 8-bit original data) in the storage array (see C in FIG. 3).

Figure 4:
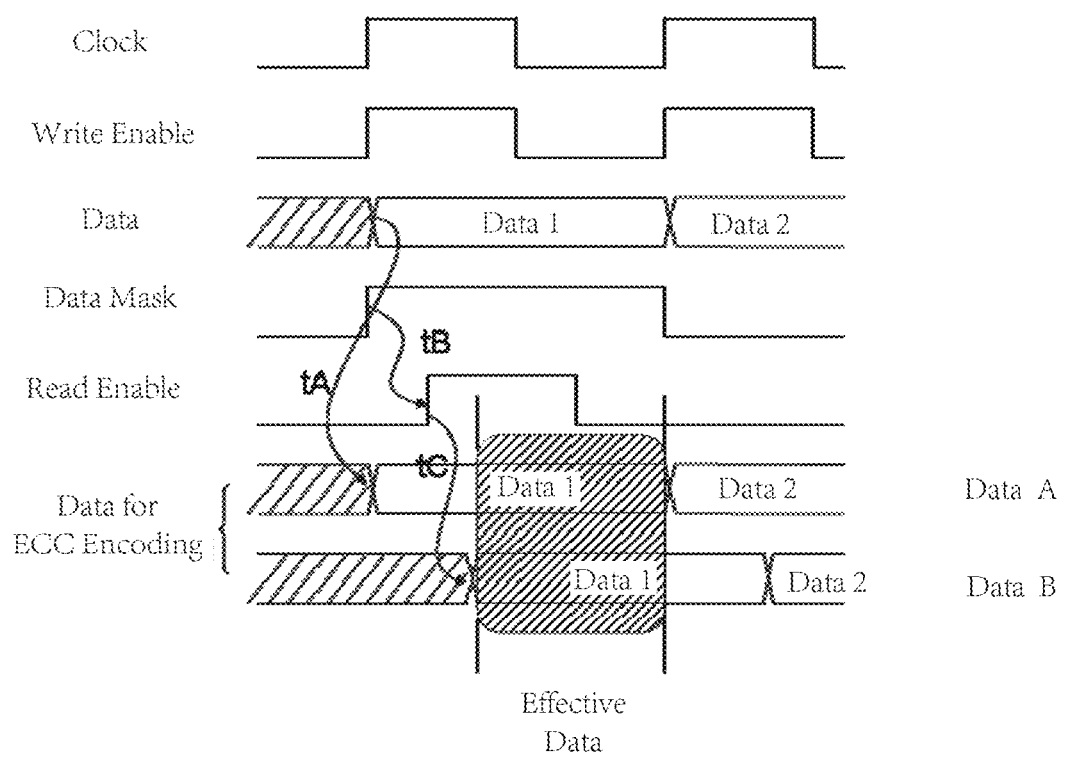
FIG. 4 is a timing diagram of a first computer memory access method by reading instead of writing.

FIG. 4 shows a timing diagram for a computer memory access method by means of reading instead of writing, as described in U.S. patent application Ser. No. 14/528,814, entitled "COMPUTER MEMORY ACCESS" and filed on the same date herewith, whose contents are hereby incorporated by reference in their entirety. Upon the clock and the write enable signal are effective, an unmasked portion of external data (i.e., data to be stored) is transmitted to the ECC encoding circuit to be used for generating parity bits. The sign to shown in FIG. 4 refers to the time from the rising edge of the write enable signal to the data being transmitted to the ECC encoding circuit. As to the masked portion of the external data, data mask triggers read enable signal. As can be seen in FIG. 4, the time from data mask being detected to the rising edge of the read enable signal is tB. The read enable signal initiates the operation of reading from the storage unit of the memory the data corresponding to the portion of the external data being masked off. The sign tC in FIG. 4 refers to the time from the rising edge of the read enable signal to the data corresponding to the portion of the external data being masked off being read from the storage unit of the memory.

In FIG. 4, "data A" refers to the portion of the external data without being masked off, and "data B" refers to the data read from the storage unit of the memory corresponding to the portion being masked off. Data A and data B are merged, and the merged data is used to generate parity bits. As can be seen from FIG. 4, the time length of tA is different from the total length of tB and tC. Thus, the time that can be used for encoding is reduced, which will cause an adverse impact on the encoding of ECC and writing data, especially in the case of high frequency. The "effective data" in FIG. 4 refers to the overlap portion of data A and data B, which is used for ECC encoding. The shadow portion shown in FIG. 4 indicates the time that can be used to generate parity bits. As shown in FIG. 4, the time for ECC encoding is short.

Furthermore, the shadow portion shows that during the time for ECC encoding, data A and data B both are effective data.

Figure 5:
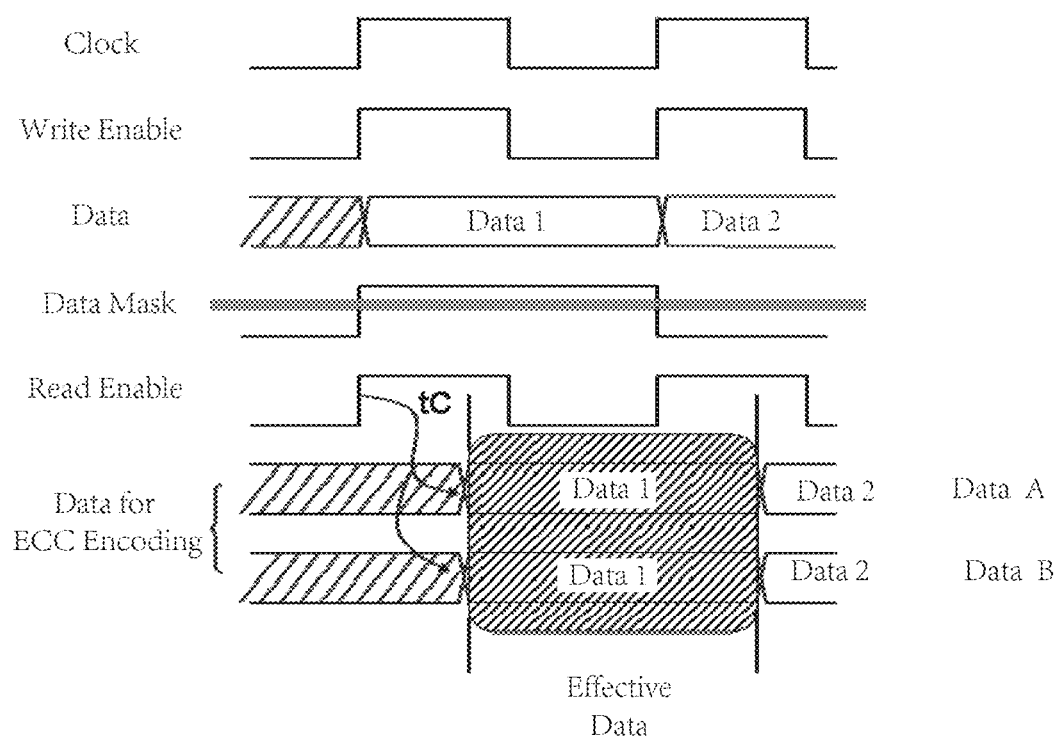
FIG. 5 is a timing diagram of a second, improved computer memory access method.

FIG. 5 is a timing diagram of an improved computer memory access method by means of quick reading instead of writing. In this computer memory access method, the reading action is not triggered by data mask; instead, all the data for ECC encoding is acquired by reading. As shown in FIG. 5, at the time when the clock and the write enable signal are both effective, the read enable signal becomes effective. In one example, the write enable signal is used to trigger the action of reading. After the time tC, data A (the unmasked portion of the external data) and data B (the data read from the storage array corresponding to the masked portion of the external data) are sent to the ECC encoding circuit simultaneously to generate parity bits, in which data A and data B are merged according to the sequence indicated by data mask signals to form complete data that has the same bits with the external data. As shown in FIG. 5, the time for ECC encoding is extended, which facilitate the generation of parity bits.

In some examples, the unmasked portion and the masked portion of the external data are denoted by the data mask signals (DM signals). For example, the unmasked external data portion is denoted by a data mask signal with a value of 0, and the masked external data portion is denoted by a data mask signal with a value of 1. It should be understood that the unmasked external data portion can also be denoted by a data mask signal with a value of 1, and the masked external data portion can be featured by a data mask signal with a value of 0.

In some examples, the external data is 64-bit, and each 8-bit of the external data in an order of the lower bits to the higher bits has one corresponding data mask signal. When the data mask signal denoting the $n^{th}$ Byte (8-bit) of the external data is effective, the $8n^{th}$ bit to the $8n+7^{th}$ bit of the external data will be masked off (wherein n is an integer, and $0 \le n < 8$). When merging, the data A is the unmasked portion of the external data, i.e. the data of the external data except the $8n^{th}$ to the $8n+7^{th}$ bit, and the data B is the 8-bit data read from the data storage unit corresponding to $8n^{th}$ to the $8n+7^{th}$ bit of the external data. When merging, the data of the external data except the $8n^{th}$ to the $8n+7^{th}$ bit and the 8-bit data read from the data storage unit corresponding to $8n^{th}$ to the $8n+7^{th}$ bit of the external data are merged.

Specifically, for example, the 64-bit (8 Bytes) data has 8 corresponding DM signals, and one Byte data has one corresponding DM signal. It is supposed that the portion of the unmasked external data is denoted by a data mask signal with a value of 0 (i.e., the data mask signal is ineffective), and the masked portion of the external data is denoted by a data mask signal with a value of 1 (i.e., the data mask signal is effective). If the $3^{th}$ Byte in an order of the lower bits to the higher bits of the 64-bit data is masked off (i.e., the data mask signal denoting the $3^{th}$ Byte (8-bit) of the external data is effective), the DM signal can be denoted by 00000100. When merging, the $0^{st}$ to the $15^{th}$ bit and the $24^{th}$ to the $63^{th}$ bit of the external data and the 8-bit data in the data storage unit of the memory corresponding to the $16^{th}$ to the $23^{th}$ bit of the external data are merged.

Nevertheless, it should be understood that the masked data portion being masked off can be not limited to one Byte, and the data portion being masked off can be interlaced with the data portion being masked off. This can be denoted by the data mask signals.

Figure 6:
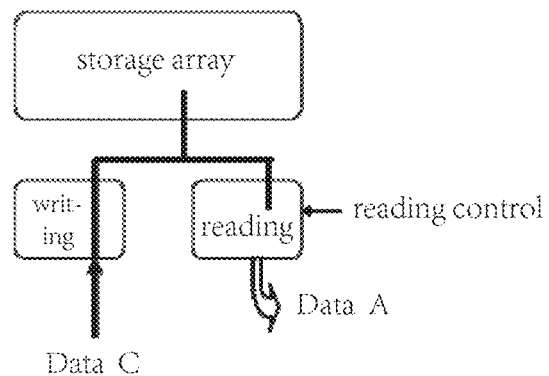
FIG. 6 is a schematic diagram of processing an unmasked data portion.
Figure 7:
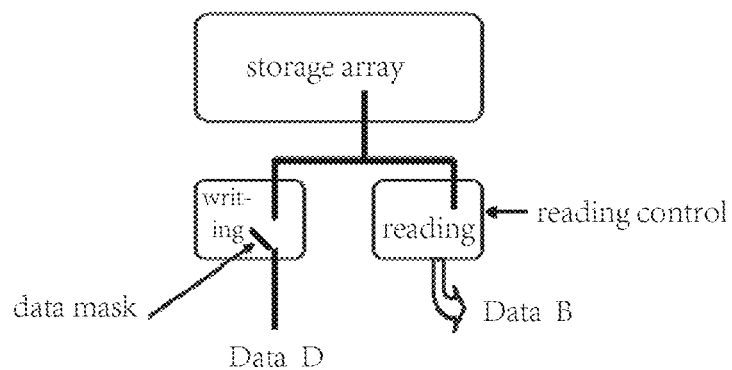
FIG. 7 is a schematic diagram of processing a masked data portion.

FIG. 6 is a schematic diagram of processing an unmasked data portion according to one embodiment of the present invention, and FIG. 7 is a schematic diagram of processing a masked data portion according to one embodiment of the present invention.

Data C in FIG. 6 is the unmasked data portion of the external data. The data C is written into the storage array via a writing circuit. The data A, which is the same as the data C, is generated by reading from the storage array via a reading circuit. The data A is determined by the data C. It can be understood that the contents of the data A and the data C are the same. Using different signs of A and C is intended to indicate that the data A and the data C are on different data lines of the memory.

Data D in FIG. 7 is the masked data portion of the external data. The data D will not be written into the storage array. The data in the storage array corresponding to the data D is read from the storage array and is denoted by B. Since the data A and the data B are read out simultaneously, they are sent to the ECC encoding circuit together.

A number of embodiments of the invention have been described. Nevertheless, it will be understood that various modifications may be made without departing from the spirit and scope of the invention. Accordingly, other embodiments are within the scope of the following claims.

What is claimed is:

1. A computer memory access method, comprising:
   receiving external data with a prefetching length;
   determining whether the external data comprises a masked data portion;
   in response to determining that the external data comprises a masked data portion:
      in further response to a write enable signal being triggered, writing an unmasked data portion of the received external data into a data storage unit of a computer memory by a writing unit;
      triggering a read enable signal at the time of the write enable signal being triggered, and reading the unmasked data portion from the data storage unit by a reading unit while reading from the data storage unit, by the reading unit, a third data portion corresponding to the masked data portion;
      merging the unmasked data portion and the third data portion to generate a merged data;
      generating parity bits from the merged data by an error correction code encoding circuit; and
      writing the generated parity bits into a parity bit storage unit of the computer memory;
   otherwise, in response to determining that the external data comprises no masked data portions:
      in further response to a write enable signal being triggered, writing the external data into the data storage unit of the computer memory by the writing unit;
      triggering a read enable signal at the time of the write enable signal being triggered and reading the external data from the data storage unit by the reading unit;
      generating parity bits from the external data read from the data storage unit by the error correction code encoding circuit; and
      writing the generated parity bits into the parity bit storage unit of the computer memory.

2. The computer memory access method of claim 1, wherein the read enable signal is triggered by the write enable signal.

3. The computer memory access method of claim 2, wherein the unmasked data portion and the masked data portion are denoted by data mask signals.

4. The computer memory access method of claim 3, wherein the unmasked data portion is denoted by a data mask signal with a value of 0, and the masked data portion is denoted by a data mask signal with a value of 1.

5. The computer memory access method of claim 2, wherein Hamming code is used to generate parity bits.

6. The computer memory access method of claim 1, wherein the unmasked data portion and the masked data portion are denoted by data mask signals.

7. The computer memory access method of claim 6, wherein the unmasked data portion is denoted by a data mask signal with a value of 0, and the masked data portion is denoted by a data mask signal with a value of 1.

8. A computer memory access method for use with partially masked data, the method comprising:
   receiving external data with a prefetching length, the external data comprising an unmasked first data portion and a masked second data portion;
   in response to a write enable signal being triggered, writing the unmasked first data portion into a data storage unit of a computer memory by a writing unit;
   triggering a read enable signal at the time of the write enable signal being triggered, and reading the unmasked first data portion from the data storage unit by a reading unit while reading a third data portion corresponding to the masked second data portion from the data storage unit by the reading unit;
   merging the first data portion and the third data portion read from the data storage unit of the computer memory, to generate a merged data;
   generating parity bits from the merged data by an error correction code encoding circuit; and
   writing the generated parity bits into a parity bit storage unit of the computer memory.

9. The computer memory access method of claim 8, wherein the read enable signal is triggered by the write enable signal.

10. The computer memory access method of claim 9, wherein the unmasked first data portion and the masked second data portion are denoted by data mask signals.

11. The computer memory access method of claim 10, wherein the unmasked first data portion is denoted by a data mask signal with a value of 0, and the masked second data portion is denoted by a data mask signal with a value of 1.

12. The computer memory access method of claim 9, wherein Hamming code is used to generate parity bits.

13. The computer memory access method of claim 8, wherein the unmasked first data portion and the masked second data portion are denoted by data mask signals.

14. The computer memory access method of claim 13, wherein the unmasked first data portion is denoted by a data mask signal with a value of 0, and the masked second data portion is denoted by a data mask signal with a value of 1.

15. A computer memory error correction method by quick reading instead of writing, the method comprising:
   in response to a write enable signal being triggered, triggering a read enable signal without determining whether there is a data mask; and then
   determining whether there is a data mask;
   in response to determining that there is a data mask:
      writing an unmasked portion of external data into a storage array of a computer memory, and then reading from the storage array by a reading circuit and transmitting to an error correction code encoding circuit the unmasked portion of the external data;
      reading from the storage array by the reading circuit and transmitting to the error correction code encoding circuit data corresponding to a masked portion of the external data which is not written into the storage array; and transmitting the unmasked portion of external data and the data corresponding to the masked portion of the external data synchronously read from the storage array;

otherwise, in response to determining that there is no data mask:

writing the external data into the storage array, and then reading from the storage array by the reading circuit and transmitting to the error correction code encoding circuit the external data read from the storage array.

16. The computer memory error correction of claim 15, wherein the read enable signal becomes effective at the time when a clock and the write enable signal are both effective, and the read enable signal is triggered by the write enable signal.

17. A computer memory error correction method, comprising:

in response to a write enable signal being triggered, triggering a read enable signal without determining whether there is a data mask;

in response that there is a data mask, writing an unmasked portion of received external data into a storage array of a computer memory, and then reading from the storage array by a reading circuit and transmitting to an error correction code encoding circuit the unmasked portion of the external data;

reading from the storage array by the reading circuit and transmitting to the error correction code encoding circuit data corresponding to a masked portion of the external data which has not been written into the storage array; and then transmitting the unmasked portion of the external data and the data corresponding to the masked portion of the external data synchronously read from the storage array.

* * * * *